| (12) | United States Patent | (10) Patent No.: US 10,943,129 B2 |
|---|---|---|
| | Herman et al. | (45) Date of Patent: Mar. 9, 2021 |

(54) LOW-LIGHT SENSOR CLEANING

(71) Applicant: Ford Global Technologies, LLC, Dearborn, MI (US)

(72) Inventors: David Michael Herman, Oak Park, MI (US); Ashwin Arunmozhi, Canton, MI (US); Venkatesh Krishnan, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 180 days.

(21) Appl. No.: 16/239,780

(22) Filed: Jan. 4, 2019

(65) Prior Publication Data

US 2020/0215972 A1 Jul. 9, 2020

(51) Int. Cl.
| B60S 1/02 | (2006.01) |
| G06K 9/00 | (2006.01) |
| B60R 1/00 | (2006.01) |
| H04N 5/232 | (2006.01) |
| B60S 1/48 | (2006.01) |
| B60S 1/56 | (2006.01) |
| H04N 5/217 | (2011.01) |

(52) U.S. Cl.
CPC ............ G06K 9/00791 (2013.01); B60R 1/00 (2013.01); B60S 1/485 (2013.01); B60S 1/56 (2013.01);
(Continued)

(58) Field of Classification Search
CPC ........ H04N 5/00; H04N 5/2171; H04N 5/225; H04N 5/232; G02B 27/0006; G01S 2007/4977; G01S 17/931; G01S 7/479; G06K 9/00; G06K 9/00791; G06K 9/00805; G06K 9/4661; G06K 9/00624; G06K 9/00993; G06K 9/20; G06K 9/62; G06T 7/00; G06T 7/0002; G06T 7/13; G06T 7/20; G06T 7/70; G06T 2007/30252; G06T 2007/30261; G06T 2007/30241; B60R 2011/004; B60R 2300/8053; B60R 2300/301; B60R 2300/106; B60R 2300/102; B60R 1/00; B60R 11/04; B60R 2300/804; B60R 2300/806;
(Continued)

(56) References Cited

U.S. PATENT DOCUMENTS

| 9,224,051 B2 | 12/2015 | Irie et al. |
| 9,224,055 B2 | 12/2015 | Kido |

(Continued)

FOREIGN PATENT DOCUMENTS

JP 3849636 B2 11/2006

OTHER PUBLICATIONS

Chabert, "Automated Lens Flare Removal", https://web.stanford.edu/.../Project_Autumn_1516/Reports/Chabert.pdf.
(Continued)

*Primary Examiner* — Mikhail Kornakov
*Assistant Examiner* — Richard Z. Zhang
(74) *Attorney, Agent, or Firm* — Frank A. MacKenzie; Bejin Bieneman PLC

(57) ABSTRACT

A system includes a camera having a field of view, a cleaning apparatus positioned to clean the camera, and a computer communicatively coupled to the camera and the cleaning apparatus. The computer is programmed to detect an obstruction on the camera based on sensing a trajectory of an external light source relative to the field of view in data from the camera, and upon detecting the obstruction, activate the cleaning apparatus.

18 Claims, 6 Drawing Sheets

(52) U.S. Cl.
CPC ........ *H04N 5/232* (2013.01); *B60R 2300/102* (2013.01); *B60R 2300/105* (2013.01); *B60R 2300/106* (2013.01); *B60R 2300/301* (2013.01); *B60R 2300/8093* (2013.01); *H04N 5/2171* (2013.01)

(58) Field of Classification Search
CPC ...... B60R 2300/8093; B60S 1/00; B60S 1/56; B60S 1/485; B60S 1/02; B60S 1/54; B60S 1/0848; B60S 1/52; B08B 3/02; B08B 5/02
See application file for complete search history.

(56) References Cited

U.S. PATENT DOCUMENTS

| | | | |
|---|---|---|---|
| 9,288,381 B2 | 3/2016 | Irie et al. | |
| 9,467,687 B2 | 10/2016 | Takemura et al. | |
| 10,013,616 B2 | 7/2018 | Gehrke | |
| 2009/0244263 A1* | 10/2009 | Saito | G06K 9/00805 348/47 |
| 2015/0203076 A1* | 7/2015 | Irie | B60S 1/0848 134/56 R |
| 2015/0334385 A1* | 11/2015 | Takemura | G06K 9/00791 348/175 |
| 2016/0311405 A1* | 10/2016 | Richardson | B60R 1/00 |

OTHER PUBLICATIONS

Gu et al., "Removing Image Artifacts Due to Dirty Camera Lenses and Thin Occluders", www1.cs.columbia.edu/CAVE/publications/pdfs/Gu_SIGGRAPH_Asia_09.pdf, International Conference on Computer Graphics and Interactive Techniques (2009).

* cited by examiner

LOW-LIGHT SENSOR CLEANING

BACKGROUND

Vehicles typically include sensors. The sensors can detect the external world, e.g., objects and/or characteristics of surroundings of the vehicle, such as other vehicles, road lane markings, traffic lights and/or signs, pedestrians, etc. For example, the sensors can be radar sensors, scanning laser range finders, light detection and ranging (LIDAR) devices, and/or image processing sensors such as cameras.

While radar sensors and LIDAR devices perform approximately the same during daytime and nighttime because they generate their own radar waves or light beams, cameras perform differently during daytime as opposed to nighttime and/or in darkened conditions because they rely on light from the environment. Imaging during nighttime can feature higher noise in images due to lower light sensitivity at night, under- or over-exposure of portions of the image due to the higher dynamic range of the scene at night, and a lower number of known optical features that can be used as ground truth sources. These issues can make it more difficult to detect dirt, rain drops, insect impacts, bird byproducts, or other debris on the camera at night than during the day.

DETAILED DESCRIPTION

Figure 1:
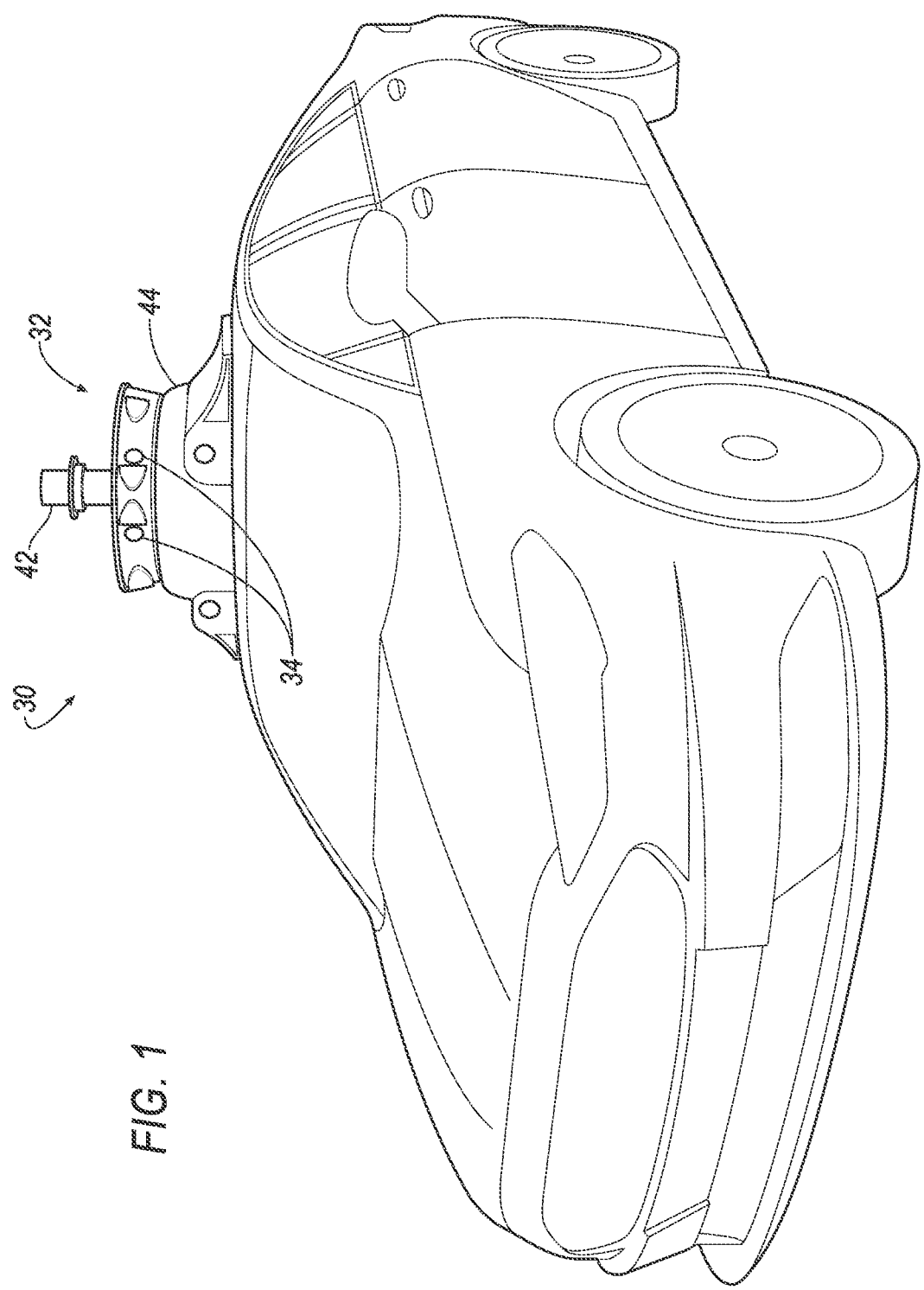
FIG. 1 is a perspective view of an example vehicle.

The system described below provides a solution to increase the performance of cameras during nighttime by helping keep the cameras clear of debris. The system can detect obstructions of the camera under low-light conditions. The system advantageously provides passive detection of debris; in other words, the system analyzes data already being produced by the camera and other sensors to detect the debris, rather than activating a component for the detection. Passive detection is efficient and provides a low chance of interference with other systems. The system can detect obstructions when they occur while generating a low rate of false positives, thus activating the cleaning when useful and better conserving resources when not useful.

A system includes a camera having a field of view, a cleaning apparatus positioned to clean the camera, and a computer communicatively coupled to the camera and the cleaning apparatus. The computer is programmed to detect an obstruction on the camera based on sensing a trajectory of an external light source relative to the field of view in data from the camera, and upon detecting the obstruction, activate the cleaning apparatus.

The system may further include a lamp positioned to illuminate the camera, and the computer may be further programmed to, upon detecting the obstruction and before activating the cleaning apparatus, activate the lamp, and then, upon detecting the obstruction in an image from the camera taken while the lamp was activated, activate the cleaning apparatus.

The system may further include a vehicle including the camera, the cleaning apparatus, and the computer.

A computer includes a processor and a memory storing instructions executable by the processor to detect an obstruction on a camera based on sensing a trajectory of an external light source relative to a field of view of the camera, upon detecting the obstruction, activate a cleaning apparatus to clean the camera.

Detecting the obstruction may be based on light intensities along the trajectory of the external light source. The instructions may further include instructions to determine expected light intensities along the trajectory. Detecting the obstruction may occur in response to determining that a difference between the light intensity and the expected light intensity at a point along the trajectory is above a threshold.

Detecting the obstruction may occur in response to determining at least a threshold quantity of times for a point along the trajectory that a difference between the light intensity and the expected light intensity is above an intensity threshold.

The instructions may further include instructions to generate a map of differences between light intensity and expected light intensity based on tracking a plurality of trajectories of external light sources including the trajectory of the external light source.

The instructions may further include to instructions disregard the external light source upon determining that the external light source is blocked by an external object for at least some of the trajectory. Instructions to determine that the external light source is blocked by an external object may include instructions to consider data received from at least one noncamera sensor.

The instructions may further include instructions to disregard the external light source upon determining that the external light source is periodically flashing.

Instructions to detect an obstruction on a camera based on sensing a trajectory of an external light source may include instructions to detect the obstruction only when ambient light intensity is below an intensity threshold.

The instructions may further include to, upon detecting the obstruction and before activating the cleaning apparatus, activate a lamp to illuminate the camera, and then, upon detecting the obstruction in an image from the camera taken while the lamp was activated, activate the cleaning apparatus.

A method includes detecting an obstruction on a camera based on sensing a trajectory of an external light source relative to a field of view of the camera, upon detecting the obstruction, activating a cleaning apparatus to clean the camera.

Detecting the obstruction may be based on light intensities along the trajectory of the external light source. The method may further include determining expected light intensities along the trajectory. Detecting the obstruction may occur in response to determining that a difference between the light intensity and the expected light intensity at a point along the trajectory is above a threshold.

Detecting the obstruction may occur in response to determining at least a threshold quantity of times for a point along the trajectory that a difference between the light intensity and the expected light intensity is above an intensity threshold.

Detecting an obstruction on a camera based on sensing a trajectory of an external light source may only occur when ambient light intensity is below an intensity threshold.

A system 32 for a vehicle 30 includes at least one camera 34 having a field of view 600, at least one liquid or air cleaning apparatus 36, 38 positioned to clean the camera 34, and a computer 40 communicatively coupled to the camera 34 and the liquid or air cleaning apparatus 36, 38. The computer 40 is programmed to detect an obstruction on the camera 34 based on sensing a trajectory 604 of an external light source relative to the field of view 600 in data from the camera 34, and upon detecting the obstruction, activate the liquid or air cleaning apparatus 36, 38.

With reference to FIG. 1, the vehicle 30 may be any passenger or commercial automobile such as a car, a truck, a sport utility vehicle, a crossover, a van, a minivan, a taxi, a bus, etc.

The vehicle 30 may be an autonomous vehicle. A vehicle computer can be programmed to operate the vehicle 30 independently of the intervention of a human driver, completely or to a lesser degree. The vehicle computer may be programmed to operate the propulsion, brake system, steering, and/or other vehicle systems based on data received from the cameras 34 and/or noncamera sensors 42. For the purposes of this disclosure, autonomous operation means the vehicle computer controls the propulsion, brake system, and steering without input from a human driver; semi-autonomous operation means the vehicle computer controls one or two of the propulsion, brake system, and steering and a human driver controls the remainder; and nonautonomous operation means a human driver controls the propulsion, brake system, and steering.

Figure 2:
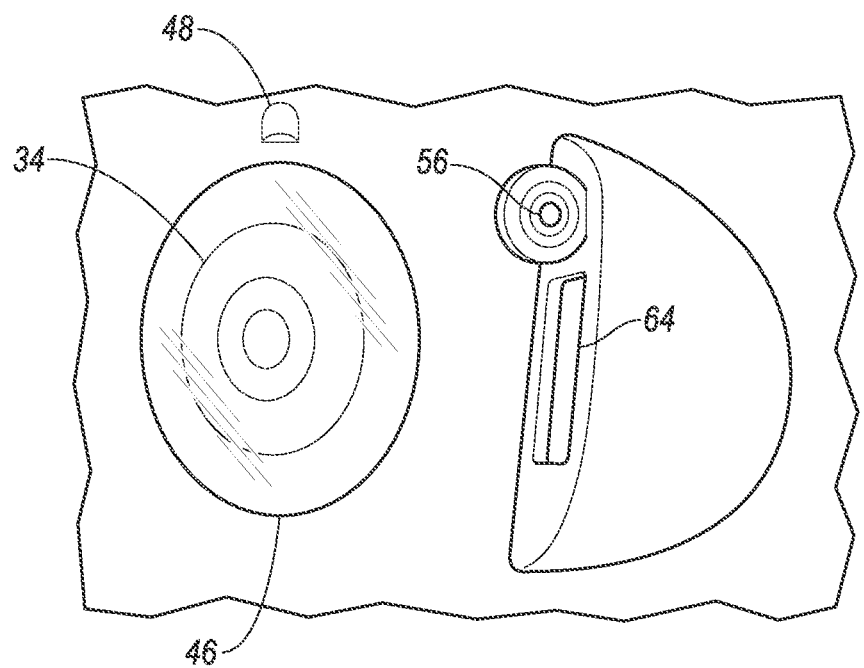
FIG. 2 is a perspective view of an example camera of the vehicle.

With reference to FIG. 2, the cameras 34 detect electromagnetic radiation in some range of wavelengths. For example, the cameras 34 may detect visible light, infrared radiation, ultraviolet light, or some range of wavelengths including visible, infrared, and/or ultraviolet light. For another example, the cameras 34 may be time-of-flight (TOF) cameras, which include a modulated light source for illuminating the environment and detect both reflected light from the modulated light source and ambient light to sense reflectivity amplitudes and distances to the scene.

The vehicle 30 includes a housing 44 for the cameras 34. The housing 44 is attached to an exterior of the vehicle 30. The housing 44 includes apertures 46. The housing 44 includes one aperture 46 for each of the cameras 34. Each camera 34 has a field of view 600 received through the respective aperture 46. For the purposes of this disclosure, a "field of view" of a camera is defined as a region of the environment from which the camera receives electromagnetic radiation.

The vehicle 30 includes the cameras 34. The cameras 34 disposed in the housing 44 can be arranged to collectively cover a 360° combined field of view with respect to a horizontal plane. The cameras 34 are substantially immovably attached directly or indirectly to the housing 44. The cameras 34 are fixed inside the housing 44. Each camera 34 has a field of view 600 oriented through the respective aperture 46, and the field of view 600 of one of the cameras 34 can overlap the fields of view 600 of the cameras 34 that are circumferentially adjacent to one another, i.e., that are immediately next to each other.

The vehicle 30 can include lamps 48. The lamps 48 are positioned to illuminate the cameras 34. Each lamp 48 is positioned to illuminate one respective camera 34. Each lamp 48 is oriented so that the lamp 48 shines directly at the respective camera 34. The lamp 48 may be any lighting apparatus suitable for shining at the camera 34, e.g., light-emitting diode (LED), tungsten, halogen, high-intensity discharge (HID) such as xenon, laser, etc.

Figure 3:
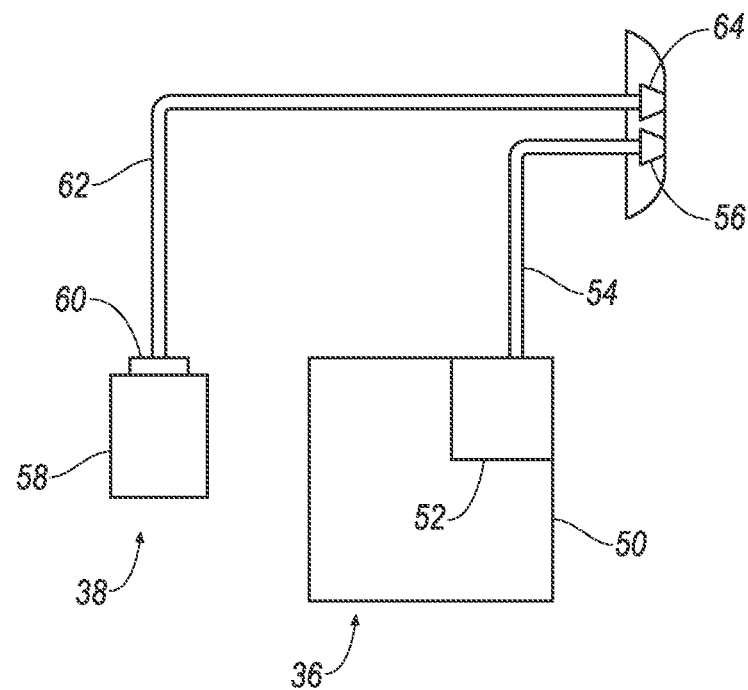
FIG. 3 is a diagram of an example cleaning apparatus for the camera.

With reference to FIG. 3, the vehicle 30 includes the liquid cleaning apparatus 36. The liquid cleaning apparatus 36 of the vehicle 30 includes a reservoir 50, a pump 52, liquid supply lines 54, and liquid nozzles 56. The reservoir 50, the pump 52, and the liquid nozzles 56 are fluidly connected to each other (i.e., fluid can flow from one to the other). The liquid cleaning apparatus 36 distributes washer fluid stored in the reservoir 50 to the liquid nozzles 56. "Washer fluid" refers to any liquid stored in the reservoir 50 for cleaning. The washer fluid may include solvents, detergents, diluents such as water, etc.

The reservoir 50 may be a tank fillable with liquid, e.g., washer fluid for window cleaning. The reservoir 50 may be disposed in a front of the vehicle 30, specifically, in an engine compartment forward of a passenger cabin. The reservoir 50 may include a heating element (not shown) such as a resistance heater to prevent the washer fluid from freezing or keep the washer fluid at an optimal temperature for cleaning. The reservoir 50 may store the washer fluid only for supplying the cameras 34 or also for other purposes, such as supply to a windshield or other sensors.

The pump 52 may force the washer fluid through the liquid supply lines 54 to the liquid nozzles 56 with sufficient pressure that the washer fluid sprays from the liquid nozzles 56. The pump 52 is fluidly connected to the reservoir 50. The pump 52 may be attached to or disposed in the reservoir 50.

The liquid supply lines 54 extend from the pump 52 to the liquid nozzles 56. The liquid supply lines 54 may be, e.g., flexible tubes.

The housing 44 includes the liquid nozzles 56. Each liquid nozzle 56 is aimed at, i.e., oriented to discharge at, the respective aperture 46 and camera 34, and therefore each liquid nozzle 56 is positioned to clean the respective camera 34, as shown in FIG. 2.

The vehicle 30 includes the air cleaning apparatus 38. The air cleaning apparatus 38 includes a compressor 58, a filter 60, air supply lines 62, and air nozzles 64. The compressor 58, the filter 60, and the air nozzles 64 are fluidly connected to each other (i.e., fluid can flow from one to the other) in sequence through the air supply lines 62.

The compressor 58 increases the pressure of a gas by reducing a volume of the gas or by forcing additional gas into a constant volume. The compressor 58 may be any suitable type of compressor, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; or any other suitable type.

The filter 60 removes solid particulates such as dust, pollen, mold, dust, and bacteria from air flowing through the filter 60. The filter 60 may be any suitable type of filter, e.g., paper, foam, cotton, stainless steel, oil bath, etc.

The air supply lines 62 extend from the compressor 58 to the filter 60 and from the filter 60 to the air nozzles 64. The air supply lines 62 may be, e.g., flexible tubes.

The housing 44 includes the air nozzles 64. Each air nozzle 64 is aimed at, i.e., oriented to discharge at, the respective aperture 46 and camera 34, and therefore each air nozzle 64 is positioned to clean the respective camera 34, as shown in FIG. 2.

Figure 4:
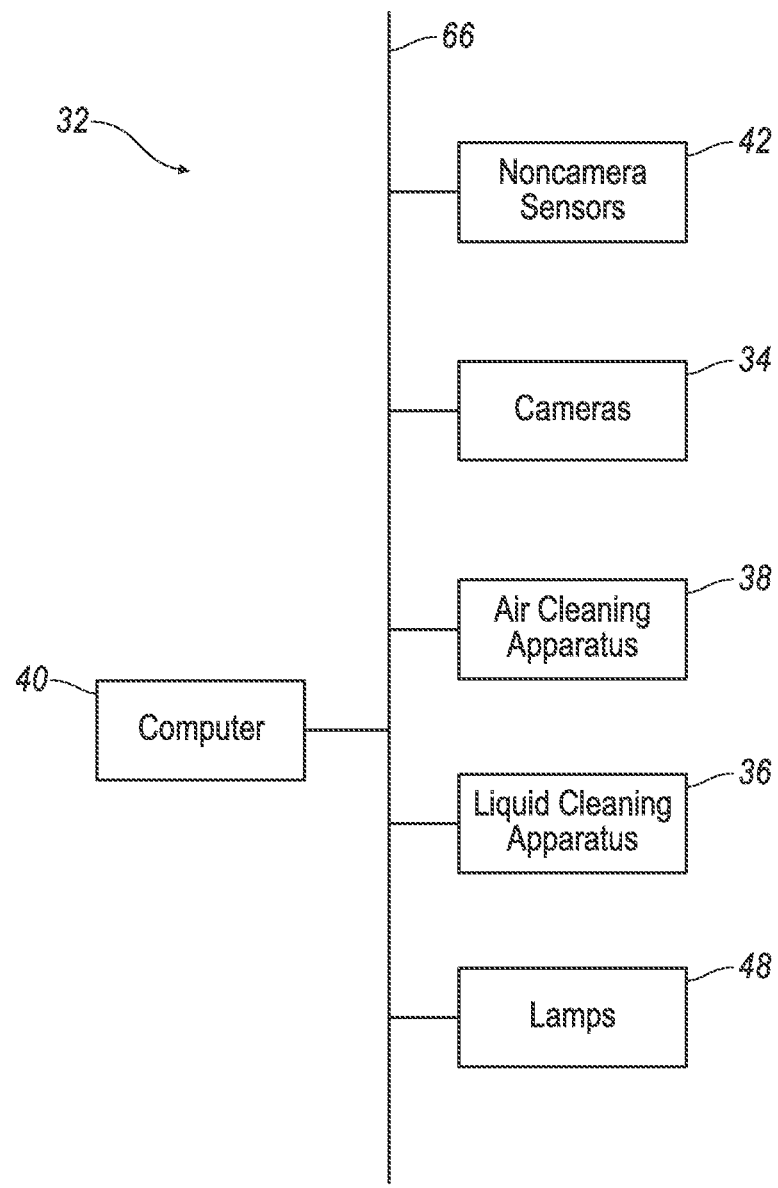
FIG. 4 is a block diagram of an example control apparatus for the cleaning system.

With reference to FIG. 4, the noncamera sensors 42 may detect the location and/or orientation of the vehicle 30. For example, the noncamera sensors 42 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The noncamera sensors 42 may detect the external world, e.g., objects and/or characteristics of surroundings of the vehicle 30, such as other vehicles, road lane markings, traffic lights and/or signs, pedestrians, etc. For example, the noncamera sensors 42 may include radar sensors, scanning laser range finders, and light detection and ranging (LIDAR) devices.

The vehicle 30 includes the computer 40. The computer 40 is a microprocessor-based controller. The computer 40 includes a processor, a memory, etc. The memory of the computer 40 includes media for storing instructions executable by the processor as well as for electronically storing data and/or databases. The computer 40 may be the same as the vehicle computer or may be a separate computer in communication with the vehicle computer.

The computer 40 may transmit and receive data through a communications network 66 such as a controller area network (CAN) bus, Ethernet, WiFi, Local Interconnect Network (LIN), onboard diagnostics connector (OBD-II), and/or by any other wired or wireless communications network. The computer 40 may be communicatively coupled to the cameras 34, the noncamera sensors 42, the air cleaning apparatus 38, the liquid cleaning apparatus 36, the lamps 48, and other components via the communications network 66.

The cameras 34 transmit data through the communications network 66 to the computer 40. The data are a sequence of image frames of the field of view 600 of the respective camera 34. Each image frame is a two-dimensional matrix of pixels. Each pixel has a brightness or color represented as one or more numerical values, e.g., a scalar value of light intensity or values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. Position in an image frame, i.e., position in the field of view 600 of the camera 34 at the time that the image frame was recorded, can be specified in pixel dimensions or coordinates, e.g., an ordered pair of pixel distances, such as a number of pixels from a top edge and a number of pixels from a left edge of the field of view 600.

Figure 5A:
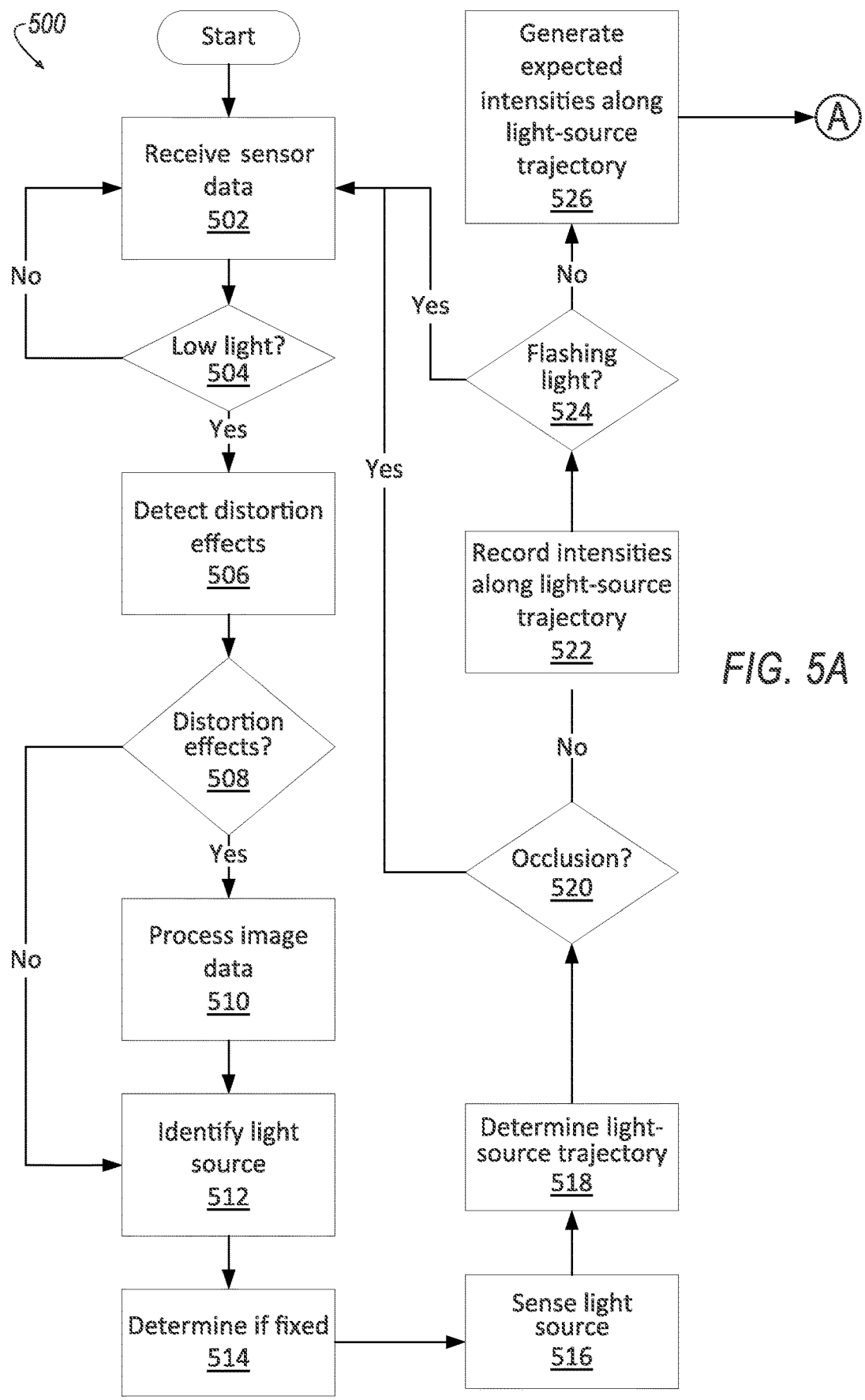
FIGS. 5A and 5B are a process flow diagram of an example process for activating the cleaning apparatus.
Figure 5B:
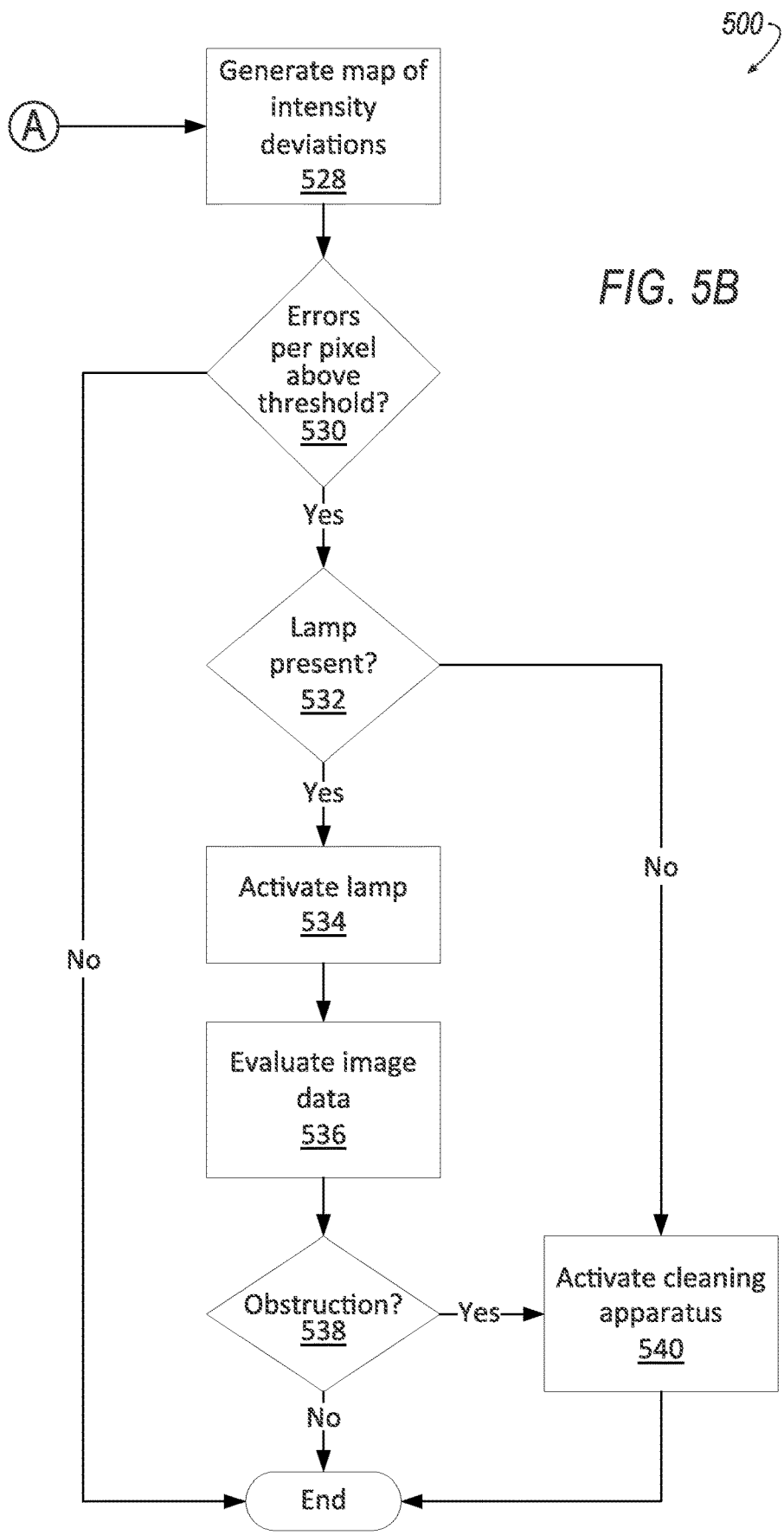

FIGS. 5A and 5B depict a process flow diagram illustrating an exemplary process 500 for activating the liquid or air cleaning apparatus 36, 38 for a respective one of the cameras 34. The memory of the computer 40 stores executable instructions for performing the steps of the process 500. As a general overview of the process 500, the computer 40 identifies and tracks an external light source in image data from the camera 34, excludes the external light source if there is an occlusion or if the external light source is a flashing light, determines deviations between intensities and expected intensities along a trajectory 604 of the external light source, and activates the liquid or air cleaning apparatus 36, 38 if the number of errors per pixel is above a threshold. The process 500 can be performed individually for each camera 34.

The process 500 begins in a block 502, in which the computer 40 receives sensor data. The computer 40 receives image data from the camera 34 through the communications network 66. The computer 40 also receives data from the noncamera sensors 42 providing a three-dimensional map of the external environment through the communications network 66. For example, the data may be generated through sensor fusion of data from LIDAR and/or radar sensors.

Next, in a decision block 504, the computer 40 determines whether ambient light intensity is below an intensity threshold. The ambient light intensity is a light intensity of the ambient environment, as determined by the image data taken by the camera 34 of the ambient environment. The computer 40 determines an intensity value for each pixel, e.g., by averaging the red, green, and blue values for that pixel; determines an average intensity value across the pixels of the image data; and compares that average intensity to the intensity threshold. The intensity threshold may be chosen to represent slightly more intense light than is present at dusk or nighttime. If the ambient light intensity is above the intensity threshold, the process 500 returns to the block 502 to continue monitoring the image data. If the ambient light intensity is below the intensity threshold, the process 500 proceeds to a block 506.

In the block 506, the computer 40 detects distortion effects in the image data. For example, the computer 40 may use known algorithms for detecting lens flare or lens bloom. As one example algorithm, the computer 40 may convert the image frames to grayscale; binarize the image frames using a range of thresholds; detect contours among the image frames resulting from the range of binarizing thresholds to define blobs, i.e., contiguous portions of the image frames; merge corresponding blobs across the binarized image frames; and filter the merged blobs according to criteria such as circularity, convexity, inertia, and area tuned using a set of test images.

Next, in a decision block 508, the computer 40 determines whether the image data includes any distortion effects. For example, continuing the example algorithm from the block 506, the computer 40 may determine whether the merged blobs from the binarized image frames satisfy the criteria. If no distortion effects are present, the process 500 proceeds to a block 512. If distortion effects are present, the process 500 proceeds to a block 510.

In the block 510, the computer 40 processes the image data to remove the distortion effects, e.g., as is known. For example, for lens flare or bloom detected using the example algorithm in blocks 506 and 508, the computer 40 identifies a fill front, i.e., a contour of the lens flare region to be filled; identifies priority patches of the region such as regions that continue strongly contrasting edges; searches the image data for known patches that are good exemplars; and selects pixels from the best patch to fill in the region.

Next, or after the decision block 508 if no distortion effects are present, the block 512 is executed. In the block 512, the computer 40 identifies an external light source. For the purposes of this disclosure, an "external light source" is defined as an entity separate from the vehicle 30 that generates light that is represented in the image data. For example, the computer 40 searches the image data, e.g., the most recent image frame, for a region fulfilling size and intensity criteria. For example, the region must be a sufficiently compact region of contiguous pixels that are all above an intensity threshold, and the number of pixels in the region must be between a lower bound and an upper bound. The intensity threshold may be chosen to include types of known light sources such as headlights of other vehicles, streetlamps, etc., but to generally exclude diffuse reflected light. The lower bound and upper bound may be chosen based on the size of known light sources as they appear in test images. For another example, the computer 40 can use three-dimensional map data from the noncamera sensors 42 to select objects that are likely to include an external light source, such as other vehicles. The computer 40 can then monitor a region of the field of view 600 corresponding to the selected object for the external light source, rather than the entirety of the field of view 600. To exclude light sources of the vehicle 30 (i.e., nonexternal light sources), the memory of the computer 40 has prestored where those light sources will appear in the field of view 600, e.g., in pixel dimensions, and the computer 40 excludes light sources at those positions.

Next, in a block 514, the computer 40 determines whether the external light source is fixed, i.e., nonmoving. The computer 40 consults map data to determine whether a known external light source, such as a streetlamp, is consistent with the position of the identified external light source. For example, the computer 40 can identify a line of physical locations in along direction from the camera 34 to the external light source, and consult map data to check whether a streetlamp, etc. is located somewhere along the line of physical locations.

Figure 6:
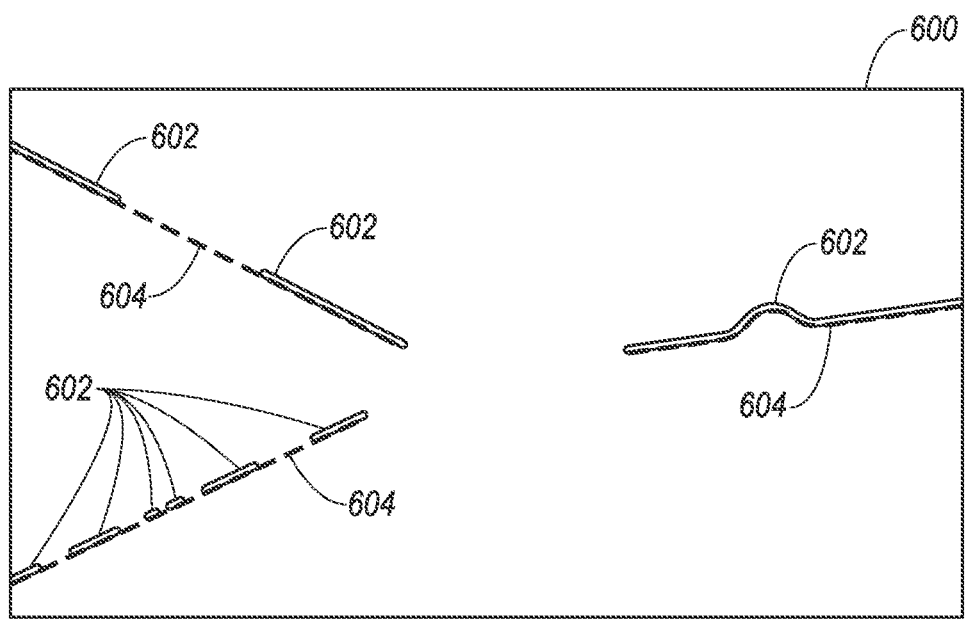
FIG. 6 is a diagram of trajectories of external light sources through a field of view of the camera.

Next, in a block 516, the computer 40 senses the trajectory 604 of the external light source relative to the field of view 600 of the camera 34. In other words, the computer 40 plots the trajectory 604 that the external light source follows across the field of view 600 in pixel dimensions. For the purposes of this disclosure, a "trajectory" is a path that something follows through the field of view 600, i.e., as measured in pixel dimensions. The trajectory is caused by a combination of motion of the external light source and motion of the vehicle 30. The computer 40 senses the trajectory 604 for a preset number of image frames or until the external light source exits the image frame. The preset number of image frames may be chosen to provide sufficient information to accurately determine the trajectory 604 in block 518, e.g., based on testing to determine a number of frames to accurately determine the trajectory. As shown in FIG. 6, the computer 40 may only be able to sense one or more discontinuous portions 602 of the trajectory 604 of the external light source.

Next, in a block 518, the computer 40 determines a trajectory 604 of the external light source. The computer 40 interpolates between the discontinuous sensed portions 602 of the trajectory 604 to determine a single trajectory 604, as shown in FIG. 6. The computer 40 can search a library of template trajectories to find a template trajectory that most closely matches the sensed portions 602 of the trajectory 604. The template trajectories chosen for the library are frequently encountered trajectories, for example, a straight line extending from a central point in the field of view 600 toward an edge of the field of view 600. Additionally or alternatively, the computer 40 can mathematically fit a function, e.g., a polynomial function or spline, to the sensed portions 602 of the trajectory 604. Additionally or alternatively, if the external light source is fixed, the computer 40 can use the known physical location of the external light source and the motion of the vehicle 30 to determine the trajectory 604 that the external light source followed through the field of view 600. Additionally or alternatively, the computer 40 may use another known method for object tracking, e.g., kernel-based tracking, contour tracking, Kanade-Lucas-Tomasi tracking, etc.

Next, in a decision block 520, the computer 40 determines whether the external light source is blocked by an external object for at least some of the trajectory 604, i.e., whether there is an occlusion along the trajectory 604. The computer 40 uses the data from the noncamera sensors 42 to check whether any objects are at a physical location that would block light from the external light source from reaching the camera 34 at a portion of the trajectory 604 that was interpolated between sensed portions 602 of the trajectory 604. If there is an occlusion, the computer 40 disregards the external light source, and the process 500 returns to the block 502 to restart and identify a new external light source. If there is no occlusion, the process 500 proceeds to a block 522.

Figure 7:
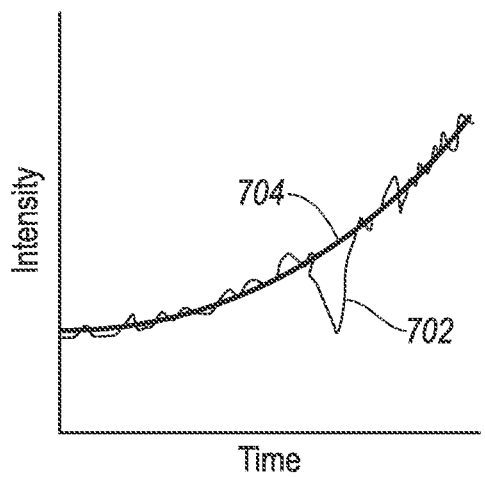
FIG. 7 is a plot of expected and actual light intensity of a first external light source.
Figure 8:
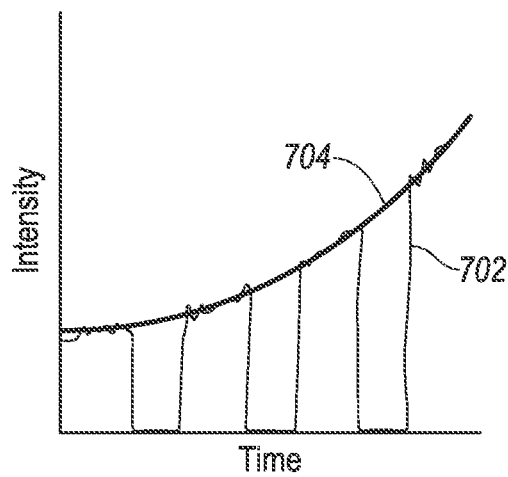
FIG. 8 is a plot of expected and actual light intensity of a second external light source.

In the block 522, the computer 40 records light intensities along the trajectory 604. The computer 40 determines an intensity value for each image frame. Each intensity value is determined by the average intensity of pixels within the position of the external light source along the trajectory 604 in that image frame. The computer 40 determines the intensity of a pixel by, e.g., averaging the red, green, and blue values for that pixel. FIGS. 7 and 8 depict two examples of the light intensity 702 plotted against time.

Next, in a decision block 524, the computer 40 determines whether the external light source is periodically flashing, e.g., blinking. The computer 40 determines start and stop times for the light intensity 702 dropping below and rising back above an intensity threshold and measures the intervals between consecutive start times and consecutive stop times. The computer 40 determines whether the intervals follow a substantially constant period. For example, the computer 40 determines whether the largest and smallest intervals are within a threshold of each other. The threshold may be a percentage of the smallest interval or may be a time value. The threshold may be chosen to include known periodically flashing lights, e.g., turn signals and railroad crossing lights, but exclude other types of lights that turn on and off. For another example, the computer 40 determines whether the standard deviation of the intervals is below a threshold. The threshold may be chosen to include known periodically flashing lights, e.g., turn signals and railroad crossing lights, but exclude other types of lights that turn on and off. FIG. 7 depicts a plot of an external light source that is not periodically flashing, and FIG. 8 depicts a plot of an external light source that is periodically flashing. If the external light source is periodically flashing, the computer 40 disregards the external light source, and the process 500 returns to the block 502 to restart and identify a new external light source. If the external light source is not flashing or is flashing but not periodically, the process 500 proceeds to a block 526.

In the block 526, the computer 40 determines expected light intensities 704 along the trajectory 604. The computer 40 plots the light intensities 702 of the sensed portions 602 of the trajectory 604 versus time and interpolates between the sensed portions 602 to arrive at the expected light intensities 704. For example, the computer 40 can mathematically fit a function, e.g., a polynomial function, to the light intensities 702 of the sensed portions 602 of the trajectory 604. FIGS. 7 and 8 each depict a plot of expected light intensity 704 and actual light intensity 702 along the trajectory 604.

Next, in a block 528, the computer 40 generates a map of differences between the light intensity 702 and the expected light intensity 704. The computer 40 subtracts the expected light intensities 704 and the actual light intensities 702 to get a sequence of intensity differences versus time. The computer 40 then maps each intensity difference to the position, in pixel dimensions, along the trajectory 604 of the external light source at that time. The map can accumulate intensity differences from multiple iterations of the process 500, i.e., from tracking a plurality of trajectories of external light sources including the trajectory 604 of the external light source.

Next, in a decision block 530, the computer 40 detects an obstruction on the camera 34 by determining whether the number of errors for at least a threshold number of pixels is above an error threshold. An "error" occurs for a pixel when the intensity difference is above an intensity-difference threshold. The threshold number of pixels and the error threshold may be chosen to minimize the frequency of false positives. The intensity-difference threshold may be chosen by measuring intensity drops with a known light source and different types of debris on the camera 34, to include intensity drops caused by the debris and exclude other fluctuations of intensity. If the computer 40 does not detect an obstruction on the camera 34, the process 500 ends. If the computer 40 detects an obstruction on the camera 34, the process proceeds to a decision block 532.

In the decision block 532, the process 500 branches depending on whether the vehicle 30 includes the lamp 48. If the vehicle 30 does not include the lamp 48, the process 500 proceeds to a block 540. If the vehicle 30 includes the lamp 48, the process 500 proceeds to a block 534.

In the block 534, the computer 40 activates the lamp 48 to illuminate the camera 34, i.e., to shine light at the camera 34.

Next, in a block 536, the computer 40 receives image data generated while the lamp 48 is illuminated.

Next, in a decision block 538, the computer 40 detects whether an obstruction is present based on the image data taken while the lamp 48 was activated. The computer 40 detects the reflection of light off of the debris. For example, machine learning may be used to develop criteria based on a set of test images of different types of debris on the camera 34 while the lamp 48 is illuminated, and the computer 40 may apply those criteria to the image data. If the computer 40 does not detect an obstruction, the process 500 ends. If the computer 40 detects an obstruction while the lamp 48 is illuminated, the process 500 proceeds to the block 540.

In the block 5450, the computer 40 activates the liquid cleaning apparatus 36 to clean the camera 34. Alternatively or additionally, the computer 40 activates the air cleaning apparatus 38 to clean the camera 34. The computer 40 may activate the liquid cleaning apparatus 36 for a preset time and then the air cleaning apparatus 38 for a preset time. After the block 540, the process 500 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
    a camera having a field of view;
    a cleaning apparatus positioned to clean the camera; and
    a computer communicatively coupled to the camera and the cleaning apparatus and programmed to detect an obstruction on the camera based on sensing a trajectory of an external light source relative to the field of view of the camera, disregard the external light source upon determining that the external light source is blocked by an external object for at least some of the trajectory, and upon detecting the obstruction, activate the cleaning apparatus.

2. The system of claim 1, further comprising a lamp positioned to illuminate the camera, wherein the computer is further programmed to, upon detecting the obstruction and before activating the cleaning apparatus, activate the lamp, and then, upon detecting the obstruction in an image from the camera taken while the lamp was activated, activate the cleaning apparatus.

3. The system of claim 1, further comprising a vehicle including the camera, the cleaning apparatus, and the computer.

4. A computer comprising a processor and a memory storing instructions executable by the processor to:
    record light intensities at respective points along a trajectory of an external light source relative to a field of view of a camera, wherein the trajectory includes sensed portions;
    determine expected light intensities at the respective points along the trajectory by interpolating between the light intensities that are on the sensed portions;
    detect an obstruction on the camera based on the light intensities at the respective points along the trajectory and the expected light intensities at the respective points along the trajectory; and
    upon detecting the obstruction, activate a cleaning apparatus to clean the camera.

5. The computer of claim 4, wherein detecting the obstruction occurs in response to determining, for one of the respective points along the trajectory having one of the light intensities and one of the expected light intensities, that a difference between the one of the light intensities and the one of the expected light intensities is above a threshold.

6. The computer of claim 4, wherein detecting the obstruction occurs in response to determining at least a threshold quantity of times for the respective points along the trajectory that a difference between a respective one of the light intensities and a respective one of the expected light intensities is above an intensity threshold.

7. The computer of claim 4, wherein the instructions further include instructions to generate a map of differences between light intensity and expected light intensity based on tracking a plurality of trajectories of external light sources including the trajectory of the external light source.

8. The computer of claim 4, wherein the instructions further include instructions to disregard the external light source upon determining that the external light source is blocked by an external object for at least some of the trajectory.

9. The computer of claim 8, wherein the instructions include instructions to determine that the external light source is blocked by the external object for at least some of the trajectory, and the instructions to determine that the external light source is blocked by the external object include instructions to consider data received from at least one noncamera sensor.

10. The computer of claim 4, wherein the instructions further include instructions to disregard the external light source upon determining that the external light source is periodically flashing.

11. The computer of claim 4, wherein instructions to detect the obstruction on the camera include instructions to detect the obstruction only when ambient light intensity is below an intensity threshold.

12. The computer of claim 4, wherein the instructions further include instructions to:
    upon detecting the obstruction and before activating the cleaning apparatus, activate a lamp to illuminate the camera; and
    then, upon detecting the obstruction in an image from the camera taken while the lamp was activated, activate the cleaning apparatus.

13. A method comprising:
recording light intensities at respective points along a trajectory of an external light source relative to a field of view of a camera, wherein the trajectory includes sensed portions;
determining expected light intensities at the respective points along the trajectory by interpolating between the light intensities that are on the sensed portions;
detecting an obstruction on the camera based on the light intensities at the respective points along the trajectory and the expected light intensities at the respective points along the trajectory; and
upon detecting the obstruction, activate a cleaning apparatus to clean the camera.

14. The method of claim 13, wherein detecting the obstruction occurs in response to determining, for one of the respective points along the trajectory having one of the light intensities and one of the expected light intensities, that a difference between the one of the light intensities and the one of the expected light intensities is above a threshold.

15. The method of claim 13, wherein detecting the obstruction occurs in response to determining at least a threshold quantity of times for the respective points along the trajectory that a difference between a respective one of the light intensities and a respective one of the expected light intensities is above an intensity threshold.

16. The method of claim 13, wherein detecting the obstruction on the camera only occurs when ambient light intensity is below an intensity threshold.

17. The method of claim 13, further comprising disregarding the external light source upon determining that the external light source is blocked by an external object for at least some of the trajectory.

18. The method of claim 17, further comprising determining that the external light source is blocked by the external object for at least some of the trajectory, wherein determining that the external light source is blocked by the external object includes considering data received from at least one noncamera sensor.

* * * * *